US010719197B2

United States Patent
Yoo et al.

(10) Patent No.: US 10,719,197 B2
(45) Date of Patent: *Jul. 21, 2020

(54) MOBILE TERMINAL EXTRACTING CONTENTS WITH A CALENDAR FOR GENERATING AND DISPLAYING AN ELECTRONIC NOTE AND METHOD THEREOF

(71) Applicant: LG Electronics Inc., Seoul (KR)

(72) Inventors: Hyejong Yoo, Seoul (KR); Miyoung Kim, Seoul (KR); Jiyoung Park, Seoul (KR); Boram Kim, Seoul (KR); Eunjeong Ryu, Seoul (KR); Jihyun Lee, Seoul (KR); Jongsup Kim, Seoul (KR); Suegyoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 245 days.

This patent is subject to a terminal disclaimer.

(21) Appl. No.: 15/359,272

(22) Filed: Nov. 22, 2016

(65) Prior Publication Data

US 2017/0075541 A1 Mar. 16, 2017

Related U.S. Application Data

(63) Continuation of application No. 13/935,037, filed on Jul. 3, 2013, now Pat. No. 9,539,504.

(30) Foreign Application Priority Data

Jan. 22, 2013 (KR) .......................... 10-2013-0007143

(51) Int. Cl.
*G06F 3/0481* (2013.01)
*G06F 16/20* (2019.01)
(Continued)

(52) U.S. Cl.
CPC ........ *G06F 3/04817* (2013.01); *G06F 3/0482* (2013.01); *G06F 3/0484* (2013.01);
(Continued)

(58) Field of Classification Search
CPC ................ G06Q 10/109; G06F 3/0482; G06F 17/30997; H04W 4/02
See application file for complete search history.

(56) References Cited

U.S. PATENT DOCUMENTS

2004/0140975 A1 7/2004 Saito et al.
2008/0076400 A1 3/2008 Moosavi et al.
(Continued)

FOREIGN PATENT DOCUMENTS

CN 102541429 A 7/2012
KR 10-2008-0098207 A 11/2008

*Primary Examiner* — Namitha Pillai
(74) *Attorney, Agent, or Firm* — Birch, Stewart, Kolasch & Birch, LLP

(57) ABSTRACT

This specification relates to a mobile terminal capable of displaying contents and a control method thereof. The mobile terminal includes a memory configured to store a plurality of contents associated with a plurality of applications together with log information relating to each of the contents, a user input unit configured to receive condition information, input in relation to the log information and a controller configured to extract contents which satisfy the condition information based on the log information related to each of the contents, and display the extracted contents.

15 Claims, 19 Drawing Sheets

(51) Int. Cl.
*G06F 16/907* (2019.01)
*G06F 16/951* (2019.01)
*H04M 1/725* (2006.01)
*G06F 3/0484* (2013.01)
*G06F 3/0482* (2013.01)

(52) U.S. Cl.
CPC ............ *G06F 16/20* (2019.01); *G06F 16/907* (2019.01); *G06F 16/951* (2019.01); *H04M 1/72522* (2013.01)

(56) References Cited

U.S. PATENT DOCUMENTS

| | | |
|---|---|---|
| 2008/0304431 A1 | 12/2008 | Karaoguz |
| 2009/0150574 A1 | 6/2009 | Kawahara et al. |
| 2011/0276396 A1 | 11/2011 | Rathod |
| 2012/0136781 A1 | 5/2012 | Fridman et al. |
| 2012/0151400 A1 | 6/2012 | Hong et al. |
| 2013/0006718 A1 | 1/2013 | Nielsen et al. |
| 2014/0052549 A1 | 2/2014 | Dollens |

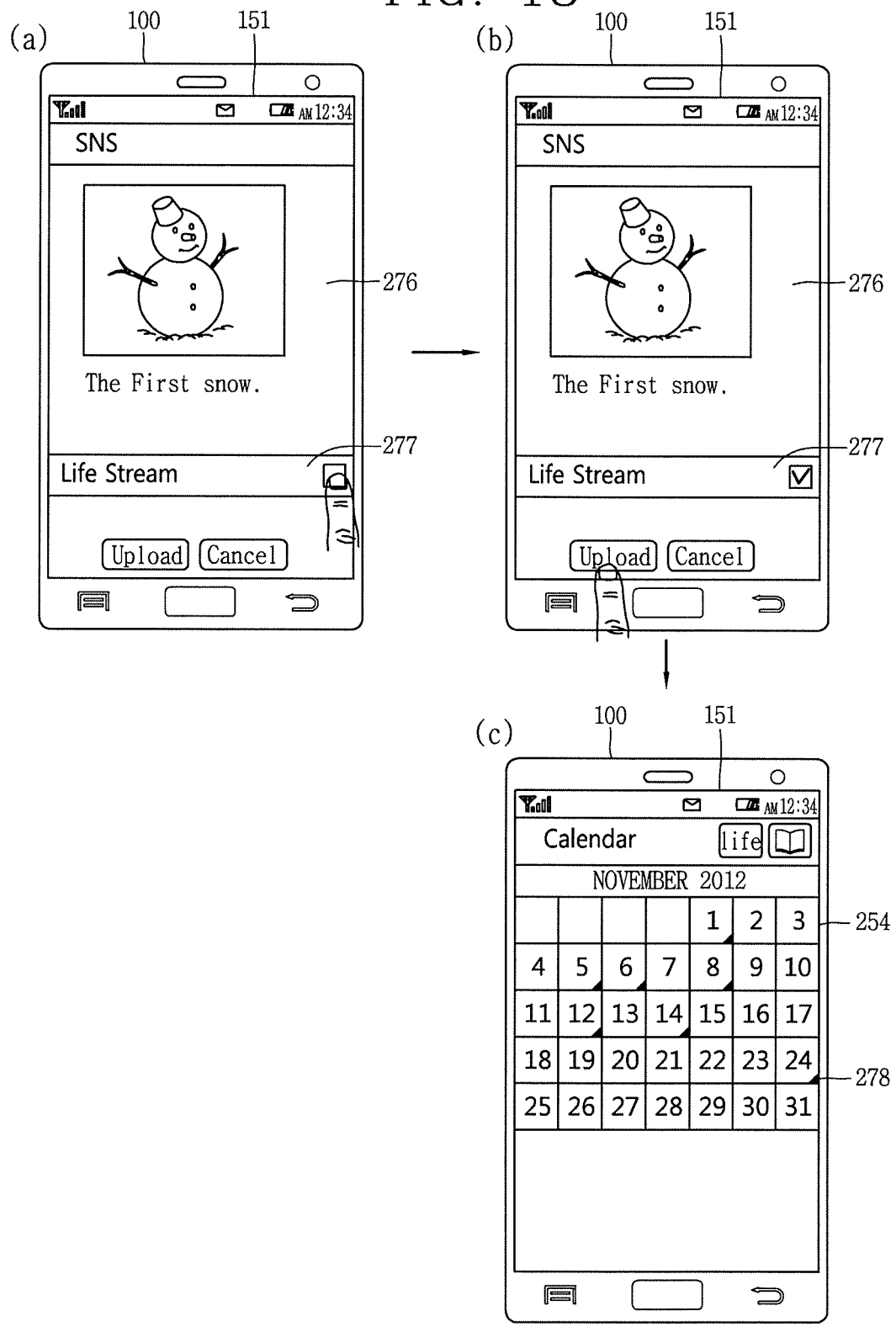

MOBILE TERMINAL EXTRACTING CONTENTS WITH A CALENDAR FOR GENERATING AND DISPLAYING AN ELECTRONIC NOTE AND METHOD THEREOF

CROSS-REFERENCE TO RELATED APPLICATION

This application is a Continuation of co-pending U.S. application Ser. No. 13/935,037, filed on Jul. 3, 2013, which claims priority under 35 U.S.C. § 119(a) to Korean Application No. 10-2013-0007143, filed on Jan. 22, 2013. The contents of which is incorporated by reference herein in its entirety.

BACKGROUND OF THE INVENTION

1. Field of the Invention

This specification relates to a mobile terminal, and particularly, to a mobile terminal capable of displaying contents and a control method thereof.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

Owing to the improvements, a user may continually generate contents for a plurality of applications while using the plurality of applications. As one application is executed, the user can view contents generated in the one application at once for a preset period of time. However, it has been difficult for the user to view contents generated in a plurality of application at once for a preset period of time.

SUMMARY OF THE INVENTION

Therefore, an aspect of the detailed description is to provide a mobile terminal capable of improving user convenience in terms of displaying contents generated in a plurality of applications, and a control method thereof.

To achieve these and other advantages and in accordance with the purpose of this specification, as embodied and broadly described herein, there is provided a mobile terminal including a memory configured to store a plurality of contents associated with a plurality of applications together with log information relating to each of the contents, a user input unit configured to receive condition information, input in relation to the log information, and a controller configured to extract contents which satisfy the condition information based on the log information related to each of the contents, and display the extracted contents.

In one exemplary embodiment, the condition information may include application type information related to the contents, format information related to the contents, date information related to the contents, location information related to the contents and counterparty information tagged to the contents.

In one exemplary embodiment, the mobile terminal may further include a display unit. Here, the controller may sequentially display a plurality of condition information input screens, which allow for an input of different condition information, respectively, on the display unit.

In one exemplary embodiment, the display unit may display an electronic calendar allowing for selection of a date. The controller may extract contents having date information, corresponding to a date selected from the electronic calendar, as log information, and display the extracted contents.

In one exemplary embodiment, the display unit may display the extracted contents on a first area of a plurality of areas, and display icons corresponding to the plurality of applications, respectively, on a second area of the plurality of areas. Here, the controller may display contents for only an application corresponding to at least one of the plurality of icons displayed on the second area, of the extracted contents, when the at least one icon is selected.

In one exemplary embodiment, the controller may decide an arrangement order of the contents displayed on the first area based on an arrangement order of the icons displayed on the second area.

In one exemplary embodiment, the controller may group the extracted contents into one group when a grouping icon is selected while the extracted contents are displayed.

In one exemplary embodiment, the display unit may display template information candidates for arranging each of the grouped contents. The controller may arrange the grouped contents based on one template information when the one template information is selected from the template information candidates, and generate an electronic note including the contents arranged based on the template information.

In one exemplary embodiment, the controller may recommend template information for arranging each of the grouped contents, among the template information candidates, based on attribute information relating to each of the grouped contents.

In one exemplary embodiment, the display unit may display an electronic bookshelf including the electronic note, and the controller may arrange contents constructing the electronic note according to preset template information to display on the display unit when the electronic note is selected.

In one exemplary embodiment, the controller may display a page linked to one content of the arranged contents on the display unit when the one content is selected from the arranged contents.

In one exemplary embodiment, the controller may display a cover of the electronic note on the electronic bookshelf, and the cover of the electronic note may display at least part of condition information previously executed for extracting the contents constructing the electronic note.

In one exemplary embodiment, the controller may extract date information related to each of the plurality of contents and display first icons on dates corresponding to the extracted date information on the electronic calendar. The controller may extract contents having date information corresponding to at least one of the first icons as log information and display the extracted contents when the at least one first icon is selected.

In one exemplary embodiment, the controller may extract date information related to each of the contents constructing the electronic note and display second icons, different from the first icons, on dates corresponding to the extracted date information on the electronic calendar. The controller may display a page including contents which have date information corresponding to at least one of the second icons as log information when the at least one second icon is selected from the electronic note.

To achieve these and other advantages and in accordance with the purpose of this specification, as embodied and broadly described herein, there is provided a control method for a mobile terminal including storing a plurality of contents associated with a plurality of applications together with log information relating to each of the contents, receiving condition information, input in relation to the log information, extracting contents which satisfy the condition information using the log information relating to each of the contents, and displaying the extracted contents.

In the exemplary embodiment, the condition information may include application type information related to the contents, format information related to the contents, date information related to the contents, location information related to the contents and counterparty information tagged to the contents.

In the exemplary embodiment, the receiving of the condition information, input in relation to the log information, may include sequentially displaying a plurality of condition information input screens each for allowing an input of different condition information.

In the exemplary embodiment, the extracting of the contents which satisfy the condition information using the log information relating to each of the contents may include displaying an electronic calendar on the display unit to allow for selection of a date, and extracting contents having date information, corresponding to a date selected from the electronic calendar, as log information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 18 is a conceptual view showing a user interface allowing for selecting whether or not to set contents as a target to be extracted when the contents are generated.

DETAILED DESCRIPTION OF THE INVENTION

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
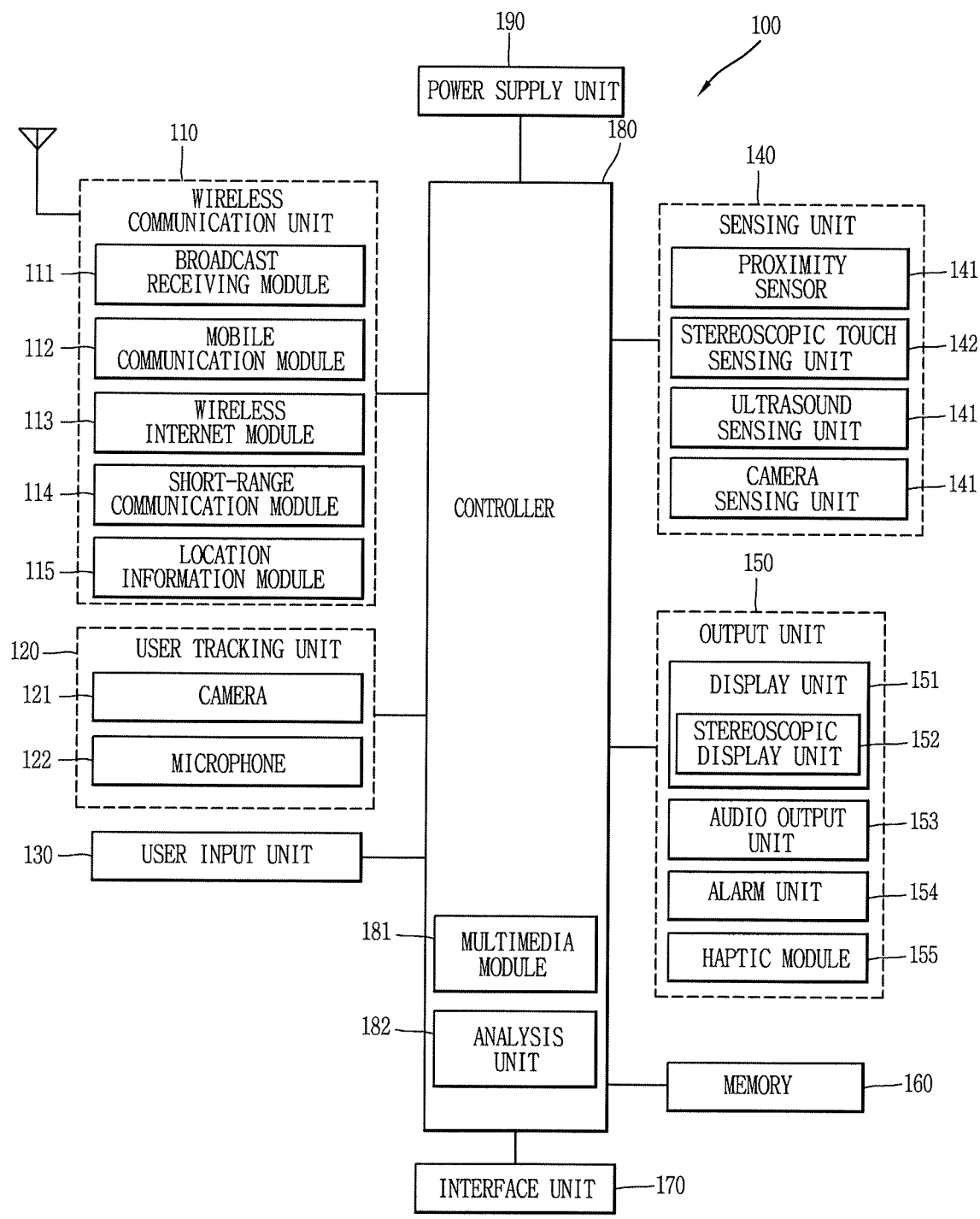
FIG. 1 is a block diagram of a mobile terminal in accordance with one exemplary embodiment of the present disclosure.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like. The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like. The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
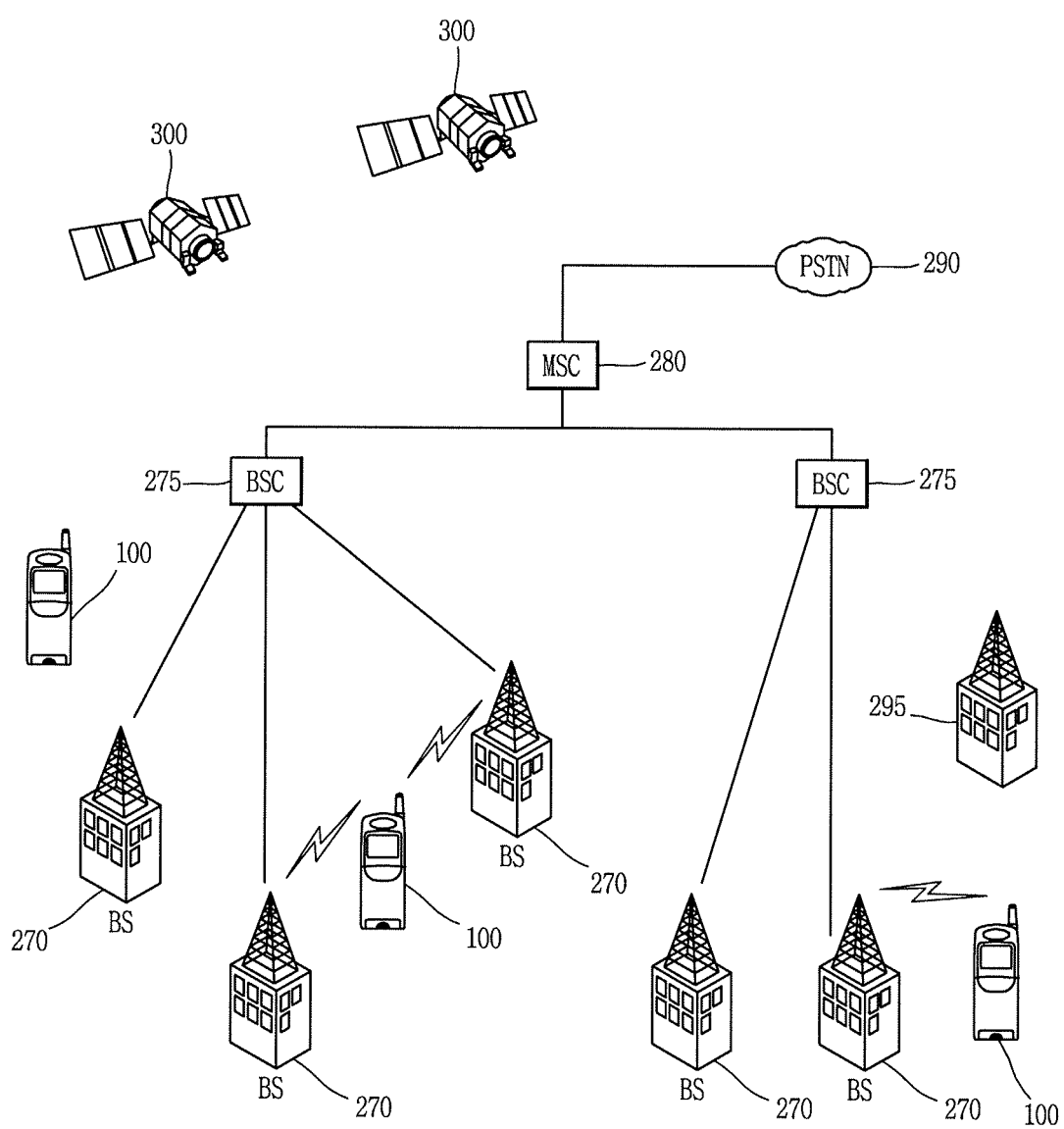
FIGS. 2A and 2B are conceptual views of a communication system operable with a mobile terminal in accordance with the present disclosure.
Figure 2B:
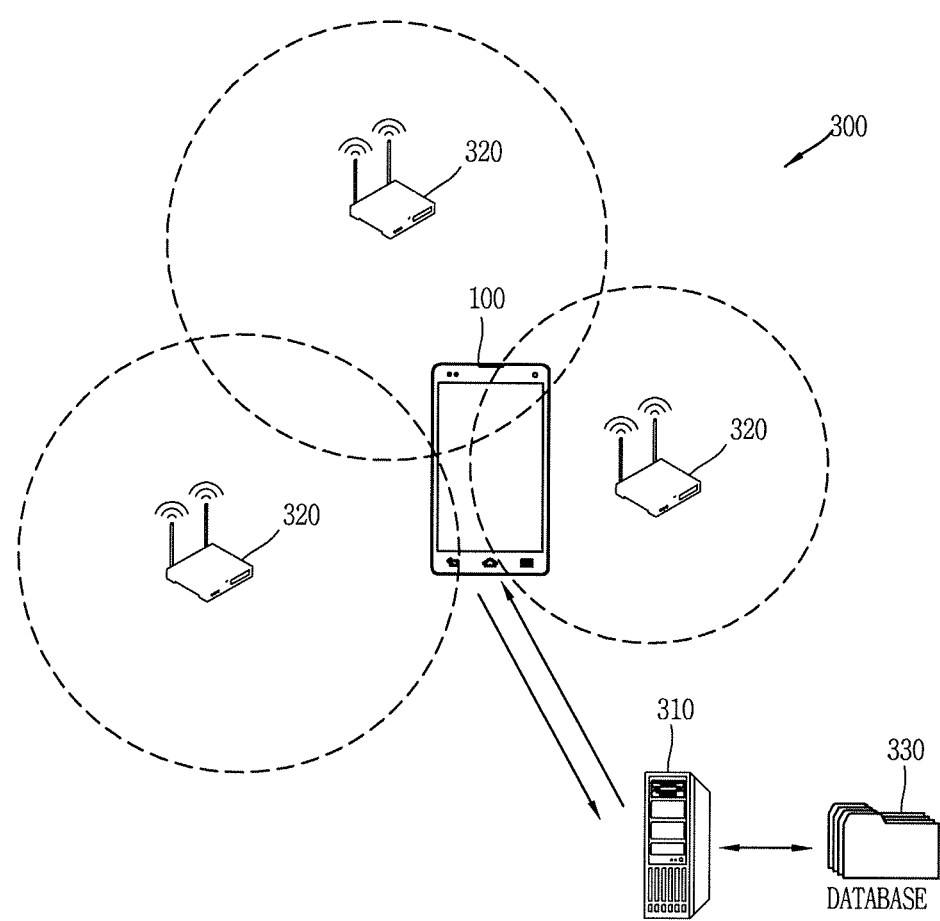

FIGS. 2A and 2B are conceptual views of a communication system operable with a mobile terminal in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100. On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
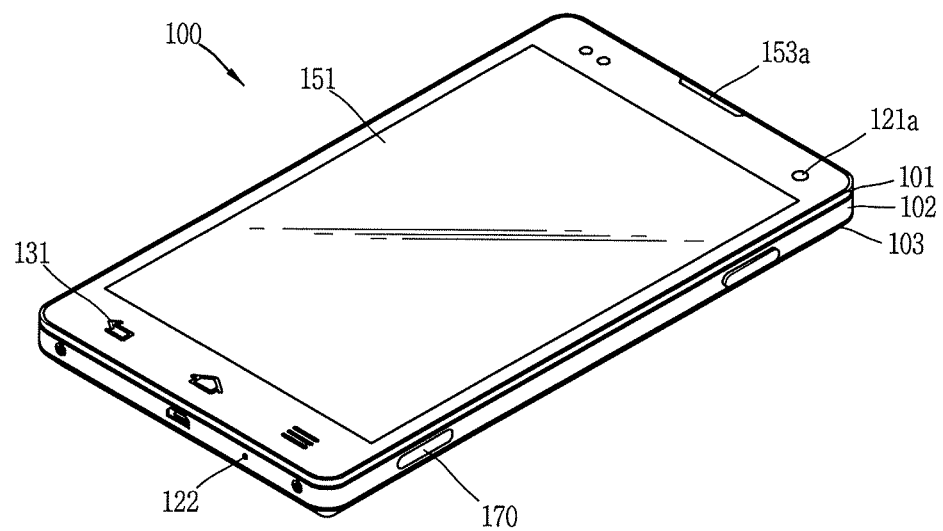
FIG. 3A is a front perspective view of a mobile terminal according to the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
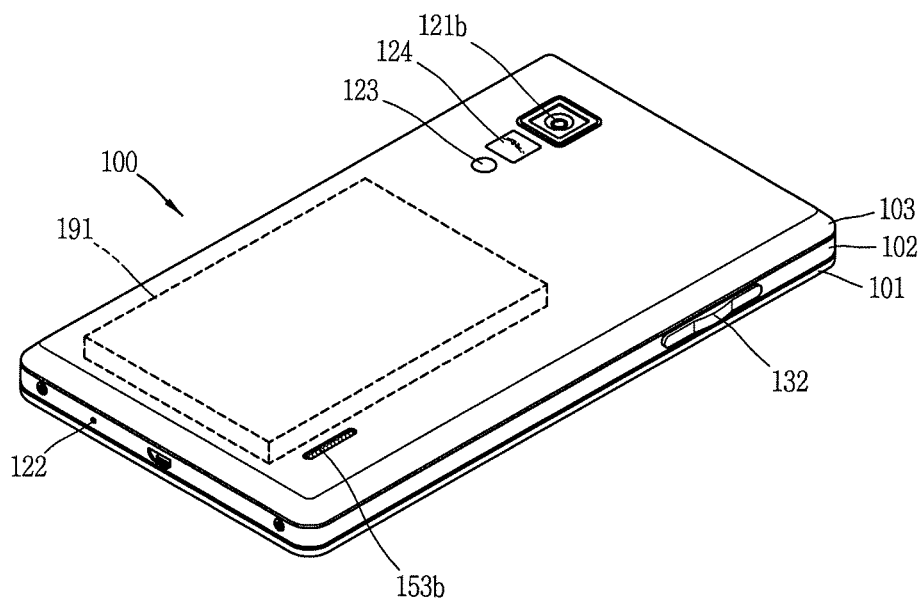
FIG. 3B is a rear perspective view of the mobile terminal shown in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Meanwhile, a user may continually generate contents for a plurality of applications while using the plurality of applications. As one application is executed, the user can view contents generated in the one application at once for a preset period of time. However, it was difficult for the user to simultaneously view contents generated in a plurality of applications for a preset period of time.

Hereinafter, description will be given of a mobile terminal 100, capable of improving user convenience in displaying contents generated in a plurality of applications, and a control method thereof, with reference to the accompanying drawings.

Figure 4:
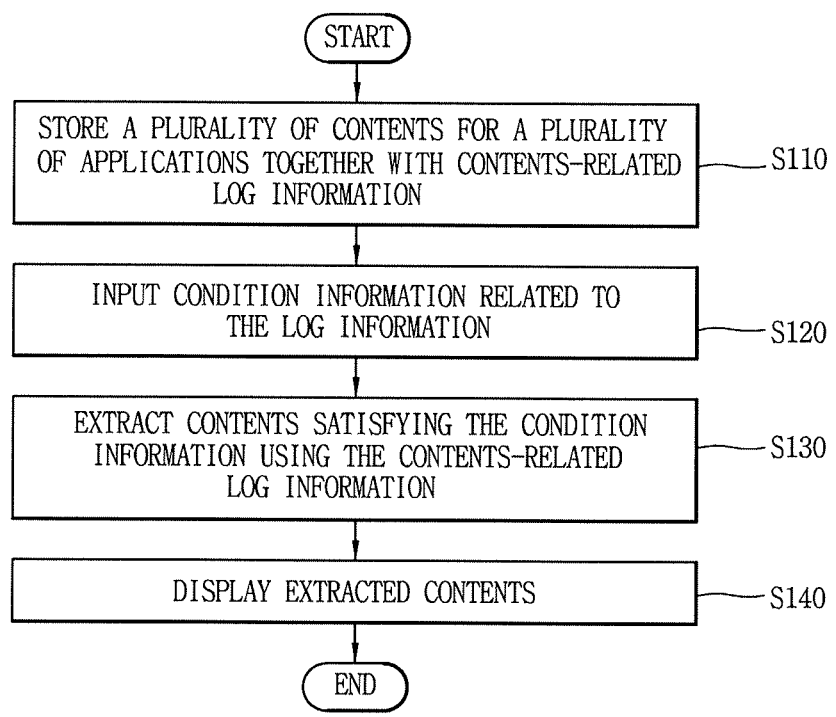
FIG. 4 is a flowchart showing a control method for a mobile terminal in accordance with one exemplary embodiment of the present disclosure.

FIG. 4 is a flowchart showing a control method for a mobile terminal 100 (see FIG. 1) in accordance with one exemplary embodiment of the present disclosure. The mobile terminal 100 may include a memory 160 (see FIG. 1), a user input unit 130 (see FIG. 1) and a controller 180 (see FIG. 1).

As shown in FIG. 4, the control method may include storing a plurality of contents associated with a plurality of applications together with log information relating to each of the contents (S110).

The memory 160 may store the content therein together with the corresponding log information. Here, the memory 160 may include a hardware element mounted inside the main body of the mobile terminal 100, or include a web storage, a cloud or the like on the Internet.

A user may generate contents for each of a plurality of applications by using the plurality of applications (S110). For example, the user may generate contents (for example, message contents) using a message application, contents using a social network service (SNS) application, or contents (for example, image contents) using a camera application.

The generated contents may be stored with log information. The log information may refer to information that every information generated during a network operation is recorded together with a generation time and the like. Here, the log information may include attribute information relating to the contents. Therefore, the log information may include at least one of application type information relating to the contents, format information relating to the contents, date information relating to the contents, location information relating to the contents and counterparty information tagged to the contents.

Next, condition information related to the log information may be input (S120).

The user may input the condition information through the user input unit 130. Here, the user input unit 130 may include at least one of a keypad, a dome switch, a display unit 151 having a touchpad (e.g., static pressure/capacitance), a jog wheel and a jog switch. Hereinafter, for the sake of explanation, as a representative example of the user input unit 130, the display unit 151 will be described.

The input condition information may be one or more than two in number. For the latter, the display unit 151 may sequentially display a plurality of condition information input screens, which allow the user to input the plurality of condition information different from each other. Or, the display unit 151 may simultaneously display the screens for allowing the user to input the plurality of condition information.

As aforementioned, the condition information is associated with the log information, and may include at least one of information relating to a type of application associated with the contents that the user desires to extract, format information relating to the contents, date information relating to the contents, location information relating to the contents and counterparty information tagged with the contents.

The controller 180 may extract the condition information in response to a user's manipulation applied onto the condition information input screen. For example, the display unit 151 may display an electronic calendar as the condition information input screen. The user may select a date from the electronic calendar. Here, the condition information may be date information corresponding to the date selected from the electronic calendar.

Afterwards, contents which meet the condition information may be extracted based on the log information relating to the respective contents (S130) and the extracted contents may be displayed (S140).

For example, upon receiving date information input as the condition information, the controller 180 may extract contents which include the input date information as the log information, from the plurality of contents stored in the memory 160. The controller 180 may display the extracted contents on the display unit 151.

Here, the extracted contents may be displayed on the display unit 151 in various arrangement manners. The extracted contents may be displayed on the display unit 151 in the order of generated dates, or by being classified for each application associated with the extracted contents.

The controller 180 may receive new condition information, which is input even after displaying the extracted contents on the display unit 151. When receiving the new condition information, the controller 180 may re-extract contents which satisfy the input condition information, from the pre-extracted contents.

As aforementioned, a plurality of contents for a plurality of applications may be displayed simultaneously on the display unit 151. Here, contents to be displayed on the display unit 151 may be decided based on condition information. This may allow the user to simultaneously view every content generated in various applications for a preset period of time.

FIGS. 5 to 9 are conceptual views showing user interfaces for displaying contents which satisfy input condition information. A mobile terminal 100 may include a memory 160 (see FIG. 1), a user input unit 130 (see FIG. 1) and a controller 180 (see FIG. 1).

Figure 5:
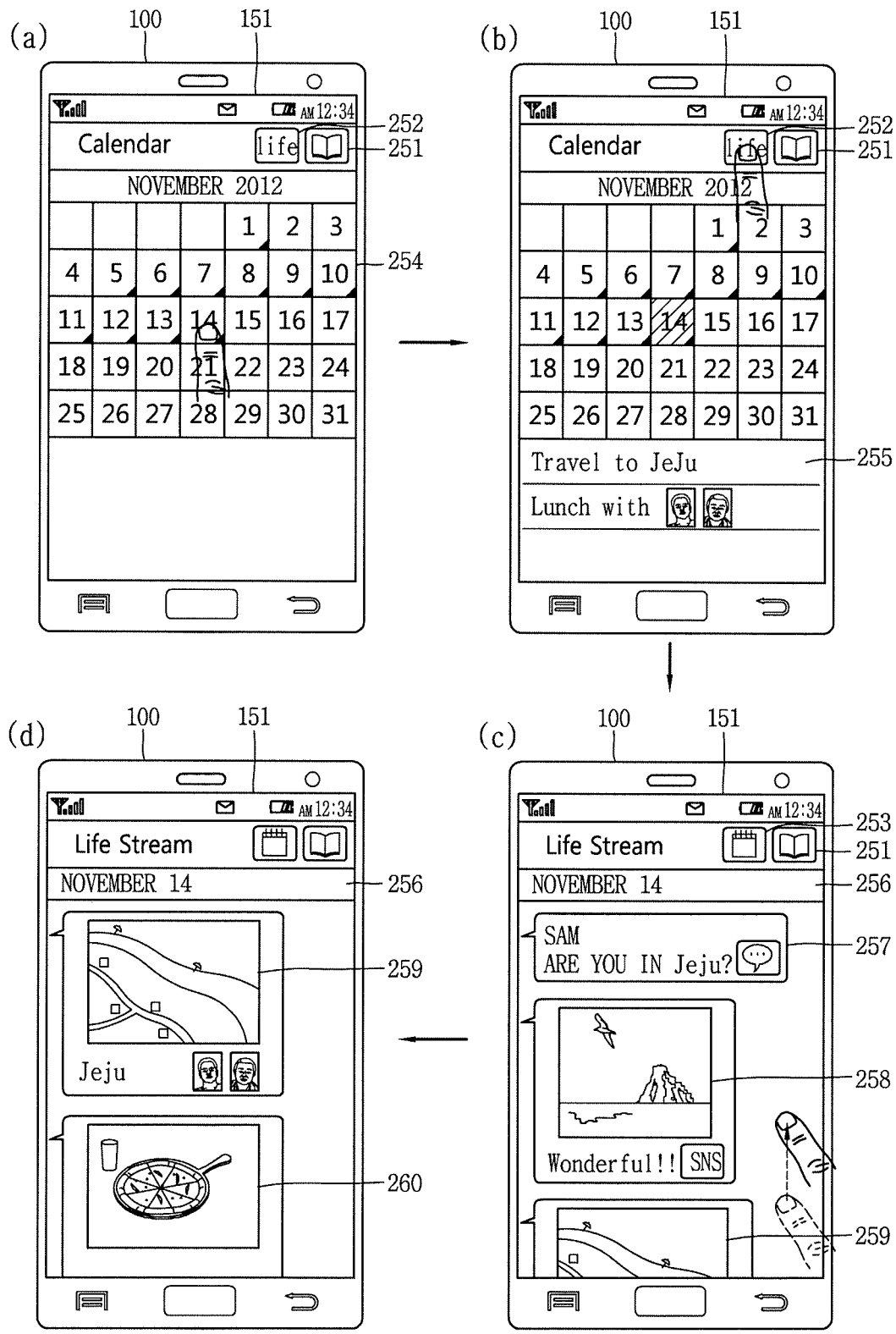
FIGS. 5 to 9 are conceptual views showing user interfaces for displaying contents which satisfy input condition information.

Hereinafter, a configuration of displaying contents satisfying input condition information will be described with reference to FIG. 5.

As shown in FIGS. 5A and 5B, the display unit 151 may display an electronic calendar 254. The electronic calendar 254 may include a plurality of dates. As shown, icons may be output on dates with contents registered, of the plurality of dates included in the electronic calendar 254.

When at least one of the plurality of dates included in the electronic calendar 254 is selected, the controller 180 may receive date information corresponding to the selected date as condition information.

Here, referring to FIG. 5B, the controller 180 may display information 255 related to contents registered on the selected date on the display unit 151. For example, event information, schedule information and the like, which are related to the contents registered on the selected date, may be displayed on the display unit 151. As shown, when the schedule information is displayed, the other party's information (for example, the other party's thumbnail image) related to the schedule information may also be displayed.

Although not shown, when new schedule information is added later, if the other party's information related to the new schedule information is equal to the other party's information related to the previous schedule information, the previous schedule information may be displayed as recommended information.

The display unit 151 may display at least one icon on one area adjacent to the electronic calendar 254. For example, an icon 252 (hereinafter, referred to as "life stream icon") corresponding to a function of extracting contents using condition information and an icon 251 (hereinafter, referred to as "grouping icon") corresponding to a function of grouping the extracted contents may be displayed on one area adjacent to the electronic calendar 254.

As aforementioned, after date information has been input as condition information, when the life stream icon 252 is selected, as shown in FIGS. 5C and 5D, the controller 180 may extract contents, which have the input date information as log information, from a plurality of contents associated with each of a plurality of applications.

The controller 180 may display an object 256, which indicates the input condition information (date information), on the display unit 151. Also, the controller 180 may display extracted contents 257 to 260 on the display unit 151.

Together with the contents 257 to 260, the display unit 151 may also display icons corresponding to applications associated with the contents 257 to 260, respectively. As shown in FIG. 5C, an icon corresponding to "TALK" application together with the content 257 of the "TALK" application. Also, an icon corresponding to "SNS" application may be displayed together with the content 258 of the "SNS" application.

In the meantime, as shown in FIG. 5D, the other party's information which was tagged when the contents associated with a "MAP" application were generated may also be displayed together with the content 259 of the "MAP" application.

Although not shown, the plurality of contents 257 to 260 may be arranged in various ways. The plurality of contents 257 to 260 may be arranged on the display unit 151 on a time basis, or by being classified for each application. The user may change the arrangement order (sequence) of the plurality of contents 257 to 260 based on the user's touch input onto the display unit 151.

Figure 6:
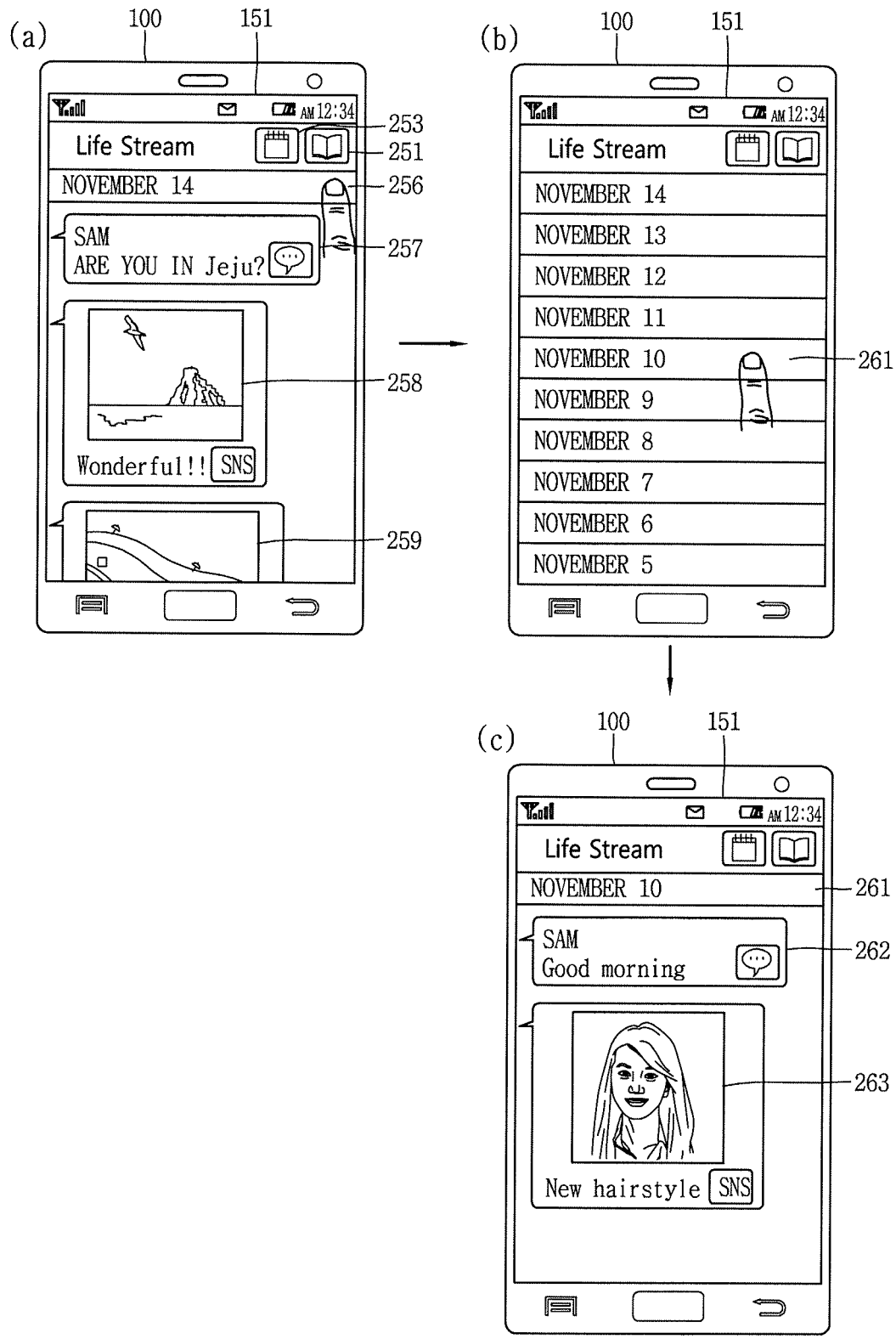

Hereinafter, a configuration of receiving new condition information will be described with reference to FIG. 6.

As shown in FIG. 6A, the controller 180 may display an object 256 indicating input condition information (e.g., date information) on the display unit 151. When the object 256 is selected, as shown in FIG. 6B, the controller 180 may display a plurality of objects for allowing a user to input new condition information (e.g., weather information) on the display unit 151.

Here, objects corresponding to dates, on which contents were registered, of dates included in the electronic calendar 254 shown in FIG. 5A may be displayed on the display unit 151.

The example of FIG. 6B shows that the objects corresponding to the contents-registered dates are displayed. However, another example in which the electronic calendar 254 shown in FIG. 5A is displayed and a user can select a new date through the electronic calendar 254 may also be considered.

Referring back to FIG. 6B, the controller 180 may allow the user to select at least one object 261 from the plurality of objects. The controller 180 may decide date information corresponding to the selected object as new condition information.

Afterwards, as shown in FIG. 6C, the controller 180 may extract contents, which have the newly selected date information as log information, from a plurality of contents associated with a plurality of applications, respectively, and display the extracted contents 262 and 263 on the display unit 151. With those contents, the controller 180 may control the display unit 151 to output the object 261 indicating the newly selected date information.

Figure 7:
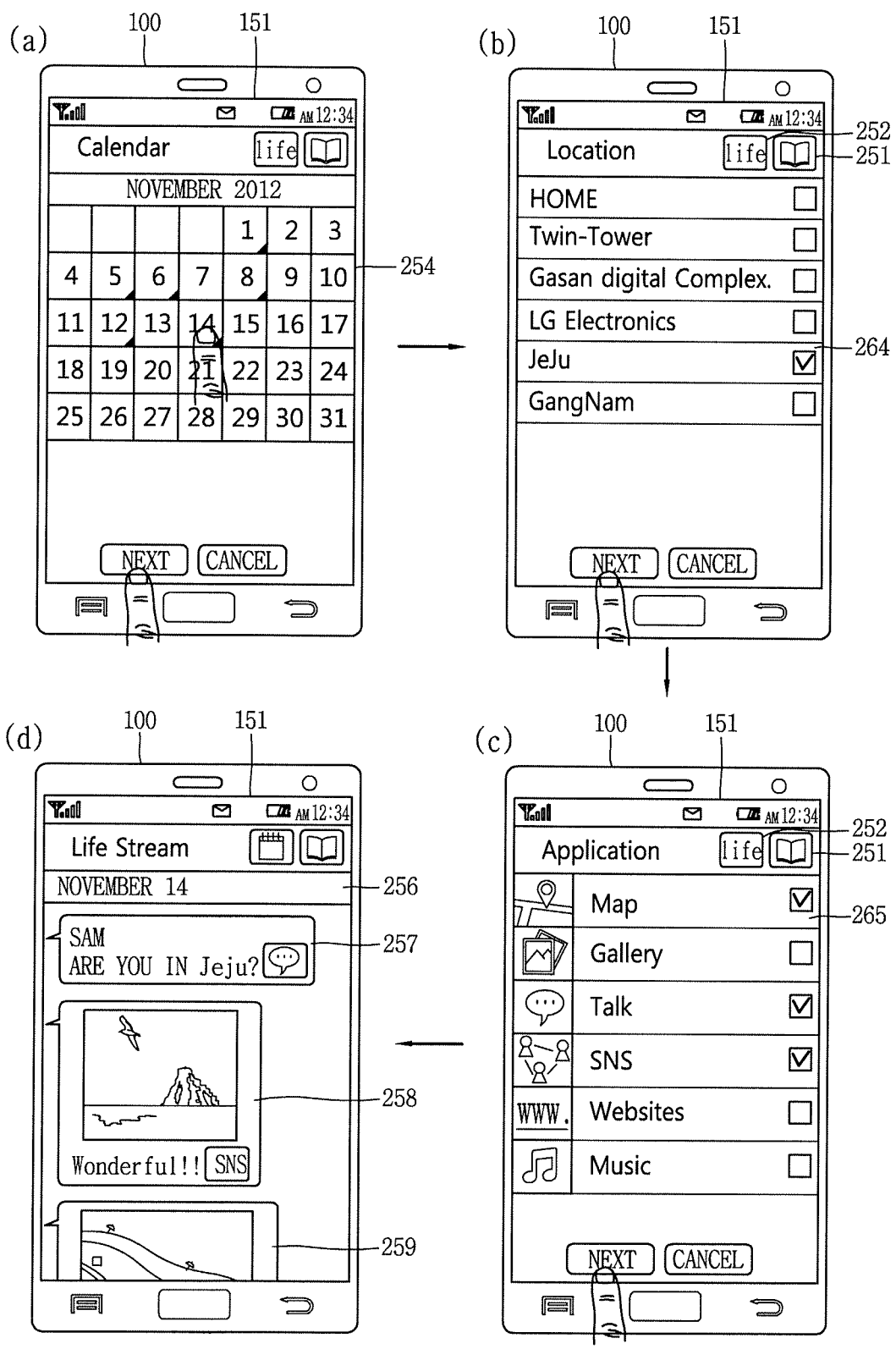

Hereinafter, a configuration that a user inputs a plurality of condition information will be described with reference to FIG. 7.

Referring to FIG. 7A, an electronic calendar 254 for allowing the user to input date information as condition information may be displayed on the display unit 151. When at least one of dates included in the electronic calendar 254 is selected, the controller 180 may receive date information corresponding to the selected date as first condition information.

Next, referring to FIG. 7B, the display unit 151 may display an information input screen 264 for allowing a user to input location information as condition information. As shown in FIG. 7B, a plurality of location information that have recently been received in the main body of the mobile terminal may be displayed on the information input screen 264. Although not shown, the user may directly input location information.

When at least one of the plurality of location information is selected, the controller 180 may receive the selected location information as second condition information.

Afterwards, as shown in FIG. 7C, the display unit 151 may display an application information input screen 265 for allowing a user to input application information as condition information. Referring to FIG. 7C, a list of applications that the user has used recently may be displayed on the information input screen 265. Although not shown, the user may directly retrieve an application or input an application name.

When at least one of the plurality of application information is selected, the controller 180 may receive the selected application information as third condition information.

Afterwards, as shown in FIG. 7D, the controller 180 may extract contents, whose log information meets the first to third condition information, from the plurality of contents associated with the plurality of applications, respectively, and display the extracted contents 257 to 259 on the display unit 151.

Figure 8:
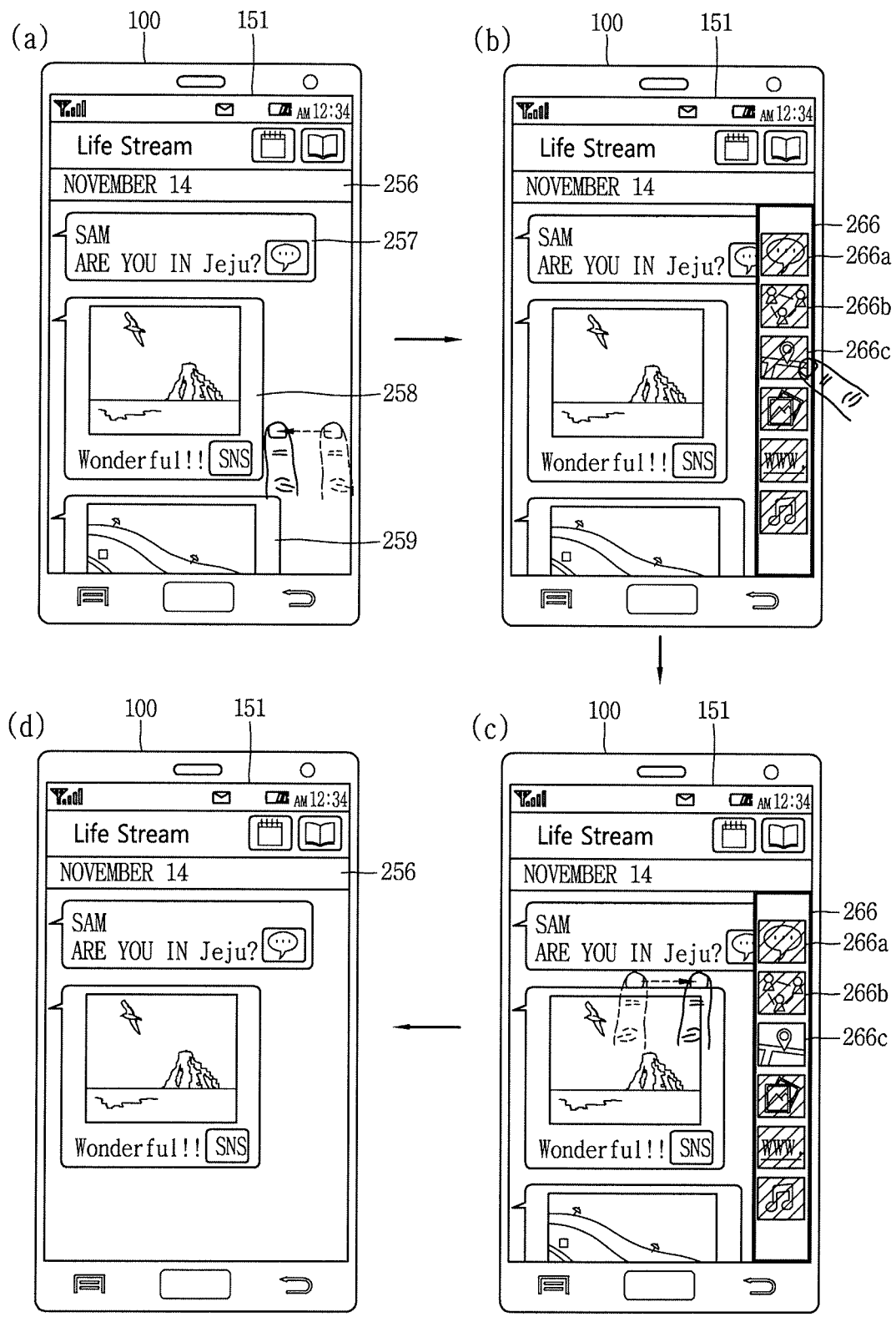

Hereinafter, a configuration of acquiring additional condition information in a state that the extracted contents are displayed will be described with reference to FIG. 8.

Referring to FIG. 8A, as described in FIGS. 5A to 5C, the controller 180 may display the contents 257 to 259, which meet the received (acquired) condition information, on the display unit 151.

Here, when the first touch input (for example, a drag input given from right to left) is applied onto the display unit 151, referring to FIG. 8B, the controller 180 may display the contents 257 to 259 on a first area and display a list of applications (application list) 266 for receiving application information as additional condition information on a second area. The application list 266 may include a plurality of icons corresponding to the plurality of applications, respectively.

Since the application information has not been acquired as the condition information, the plurality of icons may be displayed on the display unit 151 in a state of being all selected. For example, the plurality of icons may be displayed with a preset color.

Here, when one icon 266c of the plurality of icons included in the application list 266 is selected, as shown in FIG. 8C, the selected icon 266c may be displayed with a different color from the other icons. The controller 180 may allow the user to input (acquire) additional condition information indicating that only the other applications except for the application (for example, MAP application) corresponding to the selected icon 266c can be extracted.

Afterwards, when a second touch input (for example, a drag input given from left to right) is applied onto the display unit 151, as shown in FIG. 8D, the controller 180 may control the application list 266 to disappear from the display unit 151. And, only the contents 257 and 258, which meet the additionally input condition information among the previously extracted contents, may be displayed on the display unit 151.

Although not shown, with still displaying the application list 266, the contents 257 and 258 which meet the additionally input condition information may be displayed on the display unit 151.

Meanwhile, it is illustrated that the other applications except for the application corresponding to the selected icon 266c are displayed on the display unit 151. However, only an application corresponding to a selected icon may be displayed on the display unit 151.

Figure 9:
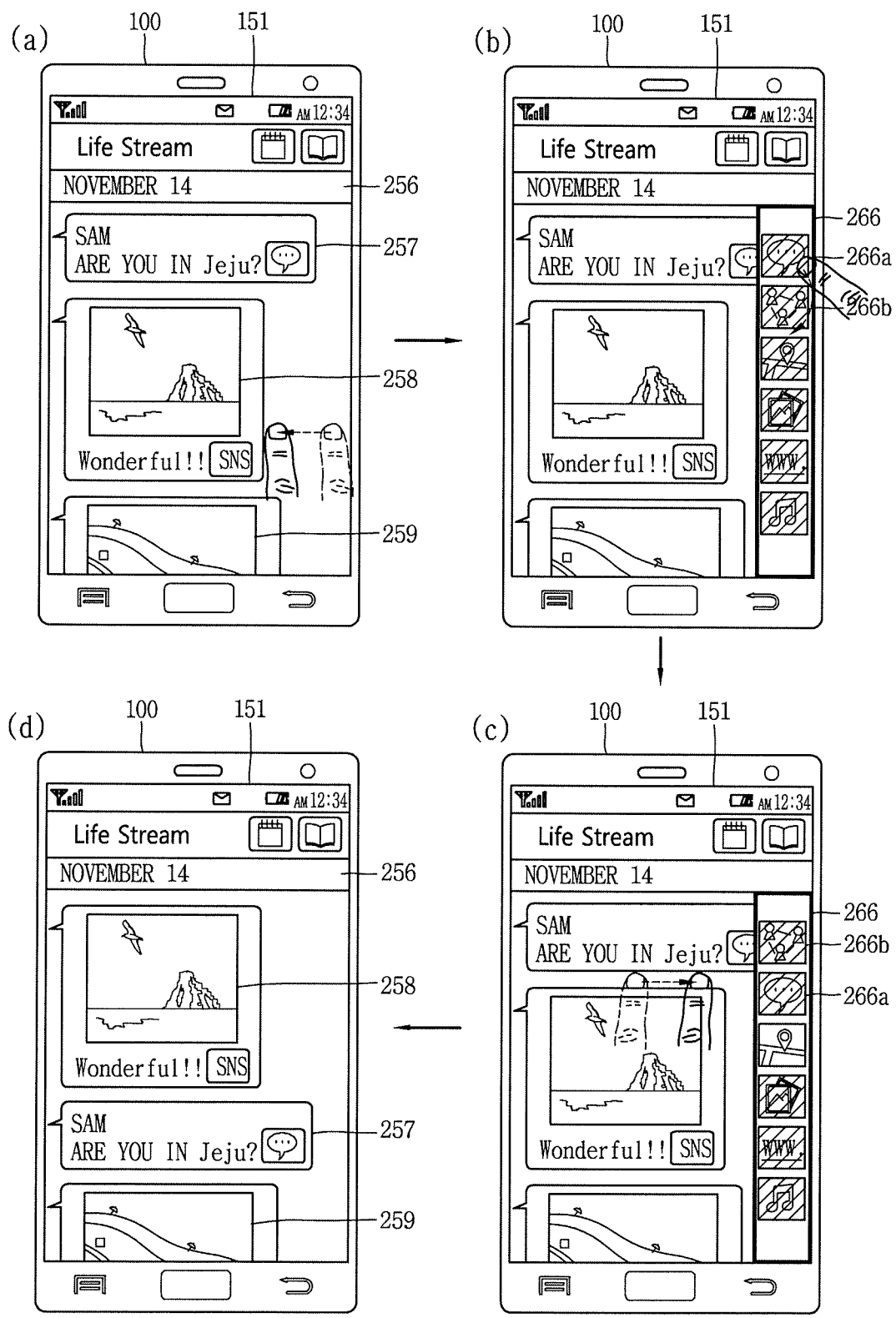

Hereinafter, a configuration of changing arrangement of extracted contents will be described with reference to FIG. 9.

As shown in FIGS. 9A and 9B, the controller 180 may display contents 257 to 259 which meet input condition information on a first area, and display an application list 266 on a second area to allow a user to input application information as additional condition information.

Here, when a first icon 266a of a plurality of icons included in the application list 266 is dragged toward a second icon 266b, as shown in FIG. 9C, the controller 180 may change the order that the first and second icons 266a and 266b are arranged on the application list 266.

Afterwards, when a second touch input (for example, a drag input given from left to right) is applied onto the display unit 151, as shown in FIG. 9D, the controller 180 may allow the application list 266 to disappear from the display unit 151.

The controller 180 may also display the content 258 associated with an application (for example, SNS application) corresponding to the second icon 266b above the content 257 associated with an application (for example, TALK application) corresponding to the first icon 266a, based on the changed arrangement order of the first and second icons 266a and 266b.

That is, the controller 180 may decide the arrangement order of the contents 257 to 259 displayed on the first area based on the arrangement order of the icons included in the application list 266 displayed on the second area.

Figure 10:
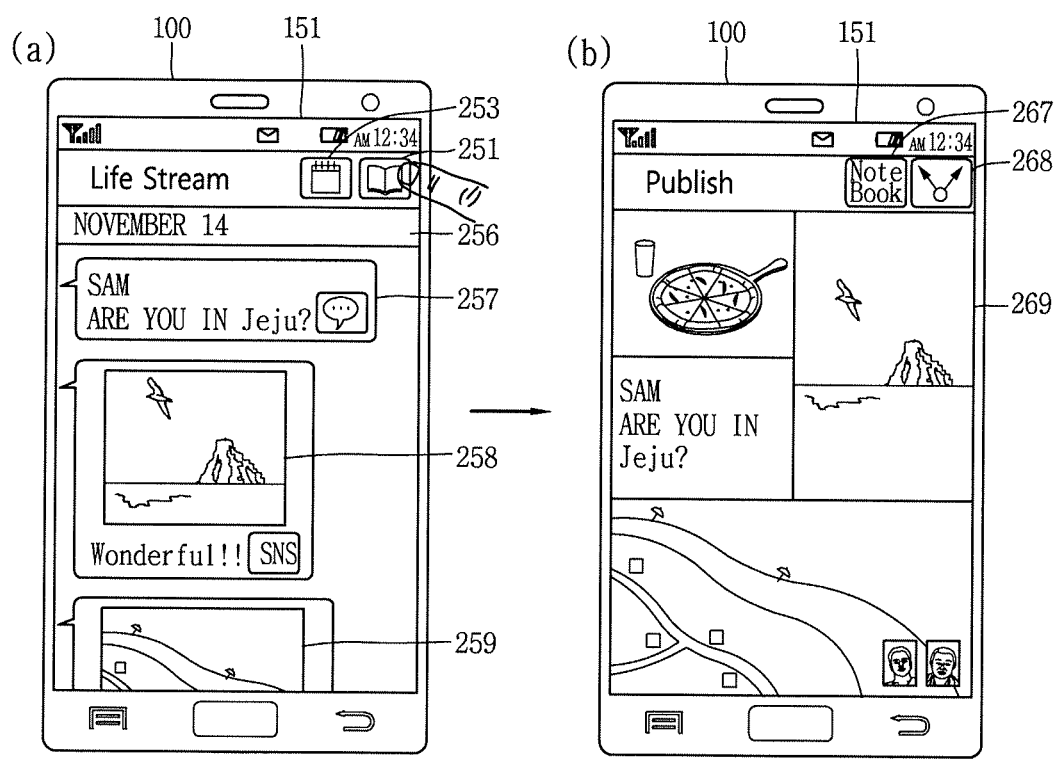
FIGS. 10 to 12 are conceptual views showing user interfaces for grouping extracted contents.
Figure 11:
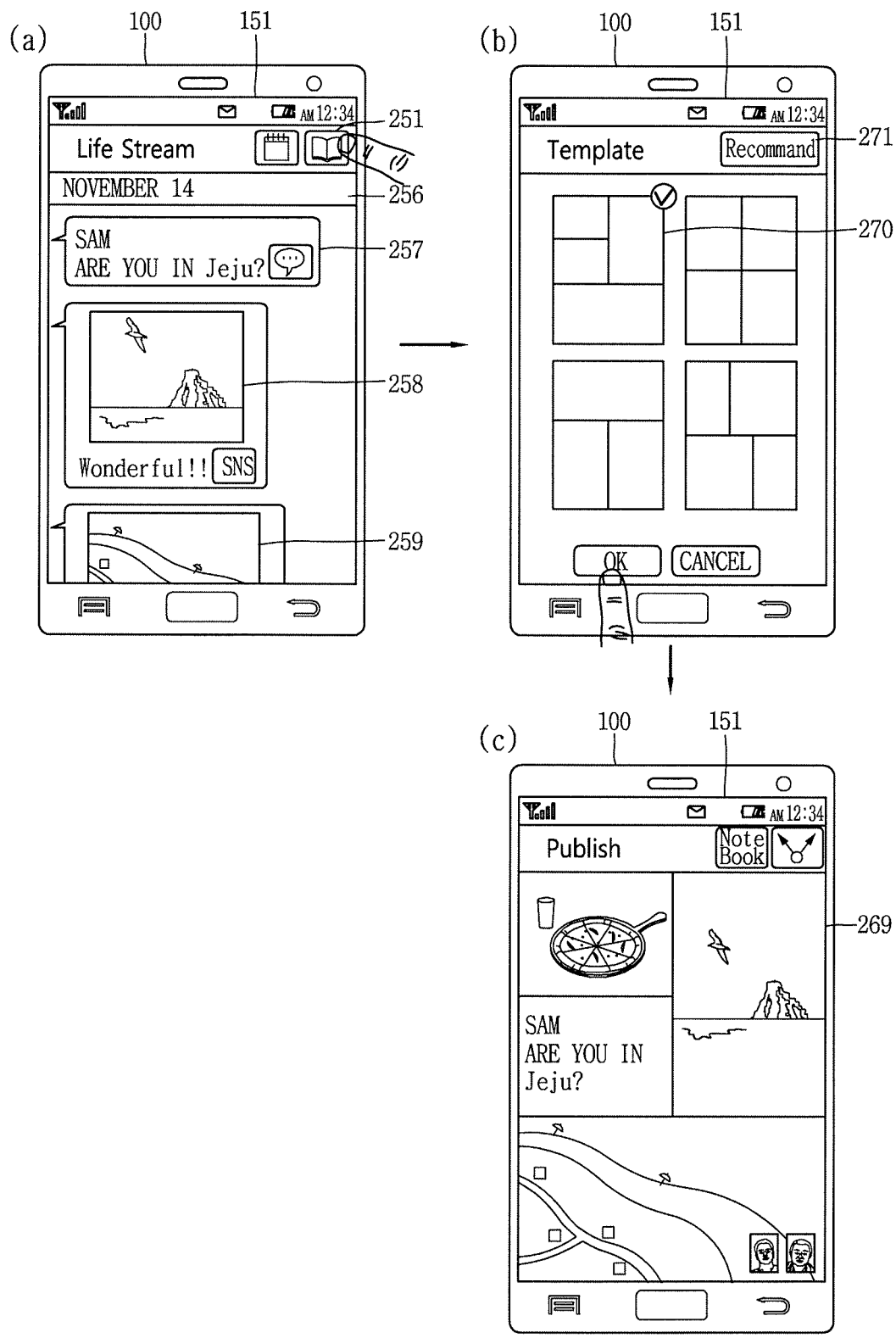
Figure 12:
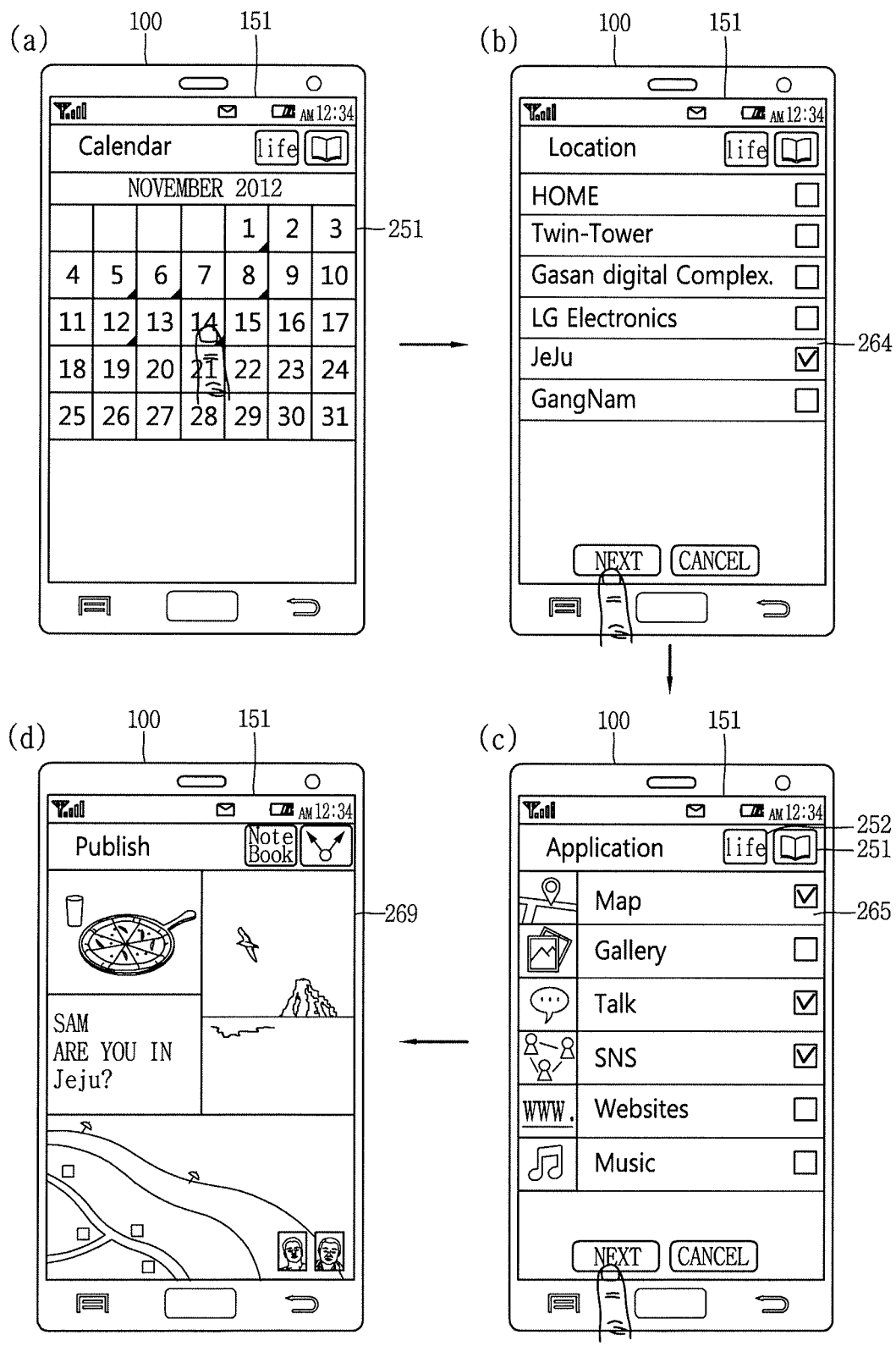

FIGS. 10 to 12 are conceptual views showing user interfaces for grouping extracted contents. A mobile terminal 100 may include a memory 160 (see FIG. 1), a user input unit 130 (see FIG. 1) and a controller 180 (see FIG. 1).

Hereinafter, a configuration of grouping extracted contents will be described with reference to FIG. 10.

As shown in FIG. 10A, similar to the configuration aforementioned with reference to FIGS. 5A to 5C, the controller 180 may display contents 257 to 260 meeting input condition information on the display unit 151.

Here, at least one icon may be displayed on the display unit 151. As shown, an icon 251 (hereinafter, referred to as "grouping icon") corresponding to a function of grouping the extracted contents 257 to 260 and an icon 253 (hereinafter, referred to as "electronic calendar icon") corresponding to a function of displaying an electronic calendar may be displayed on the display unit 151. Although not shown, an icon for allowing a user to input new condition information or additional condition information may also be displayed.

Here, when the grouping icon 251 is selected, as shown in FIG. 10B, the controller 180 may group the extracted contents 257 to 260 into one group. Also, the controller 180 may arrange the grouped contents 257 to 260 based on preset template information. The controller 180 may display the contents 257 to 260, which are arranged based on the preset template information, on the display unit 151 in a form 269 of electronic publication. Also, the controller 180 may store the contents 257 to 260 displayed in the form 269 of the electronic publication in the memory 160.

Here, the controller 180 may display at least one icon together with the contents 257 to 260 displayed in the form 269 of the electronic publication. As shown, an icon 267 (hereinafter, referred to as "electronic note generate icon") corresponding to a function of generating an electronic note including the arranged contents 257 to 260, and an icon 268 (hereinafter, referred to as "share icon") corresponding to a function of sharing the arranged contents 257 to 260 may be displayed.

Hereinafter, a configuration of acquiring template information for arranging grouped contents will be described with reference to FIG. 11.

As shown in FIG. 11A, similar to the configuration aforementioned with reference to FIGS. 5A to 5C, the controller 180 may display contents 257 to 260 meeting input condition information on the display unit 151.

When the grouping icon 251 displayed on the display unit 151 is selected, as shown in FIG. 11B, the controller 180 may display template information candidates for arranging each of the grouped contents 257 to 260 on the display unit 151.

Here, when one template information 270 is selected from the template information candidates, as shown in FIG. 11C, the controller 180 may arrange the grouped contents 257 to 260, respectively, based on the selected template information.

In the meantime, the controller 180 may recommend template information, which is to be used for arranging each of the grouped contents 257 to 260, in the template information candidates based on attribute information relating to each of the grouped contents 257 to 260. To this end, an icon 271 corresponding to a function of recommending template information may be displayed on the display unit 151. When the icon 271 is selected, the controller 180 may extract template information and arrange each of the grouped contents 257 to 260 based on the recommended template information.

Although not shown, the arrangement of each of the grouped contents 257 to 260 may be changed by a user even after each of the grouped contents 257 to 260 is arranged.

Hereinafter, a configuration of grouping contents by receiving a plurality of condition information input and arranging the grouped contents will be described with reference to FIG. 12.

As shown in FIG. 12A, the display unit 151 may display an electronic calendar 254 for allowing the user to input date information as condition information. When at least one of dates included in the electronic calendar 254 is selected, the controller 180 may acquire date information corresponding to the selected date as first condition information.

Next, as shown in FIG. 12B, the display unit 151 may display information input screen 264 for allowing the user to input location information as condition information. As shown, when at least one of the plurality of location information is selected, the controller 180 may acquire the selected location information as second condition information.

Afterwards, as shown in FIG. 12C, the display unit 151 may display an application information input screen 265 for allowing the user to input application information as condition information. As shown, when at least one of a plurality of application information is selected, the controller 180 may acquire the selected application information as third condition information.

As shown in FIG. 12D, the controller 180 may then extract contents, whose log information meets the first to third condition information, from the plurality of contents associated with the plurality of applications, respectively, and group the extracted contents 257 to 260. The controller 180 may arrange the grouped contents 257 to 260 based on preset template information to be displayed on the display unit 151 in the form 269 of electronic publication.

Figure 13:
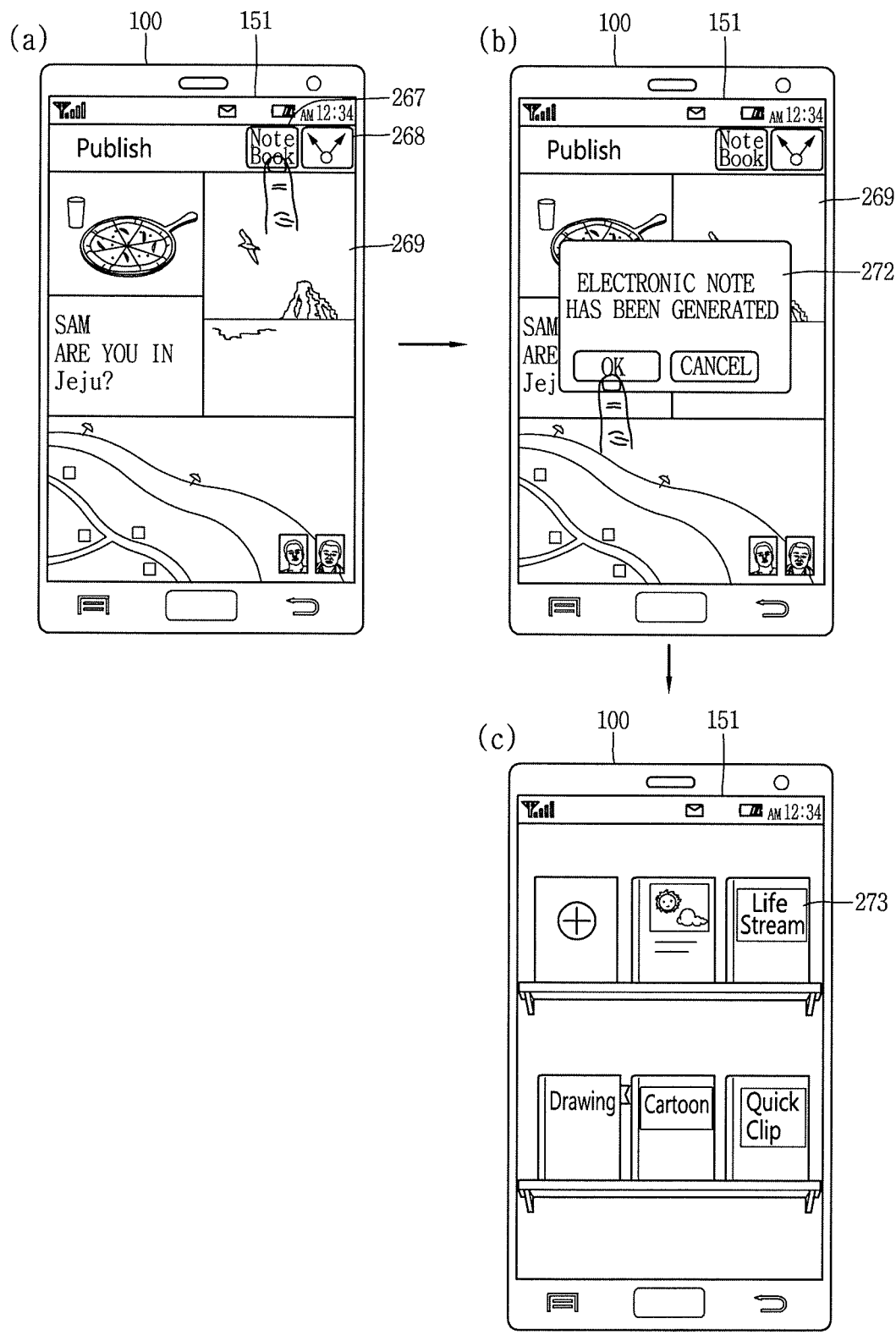
FIGS. 13 to 15 are conceptual views showing user interfaces for generating an electronic note including the grouped contents.
Figure 14:
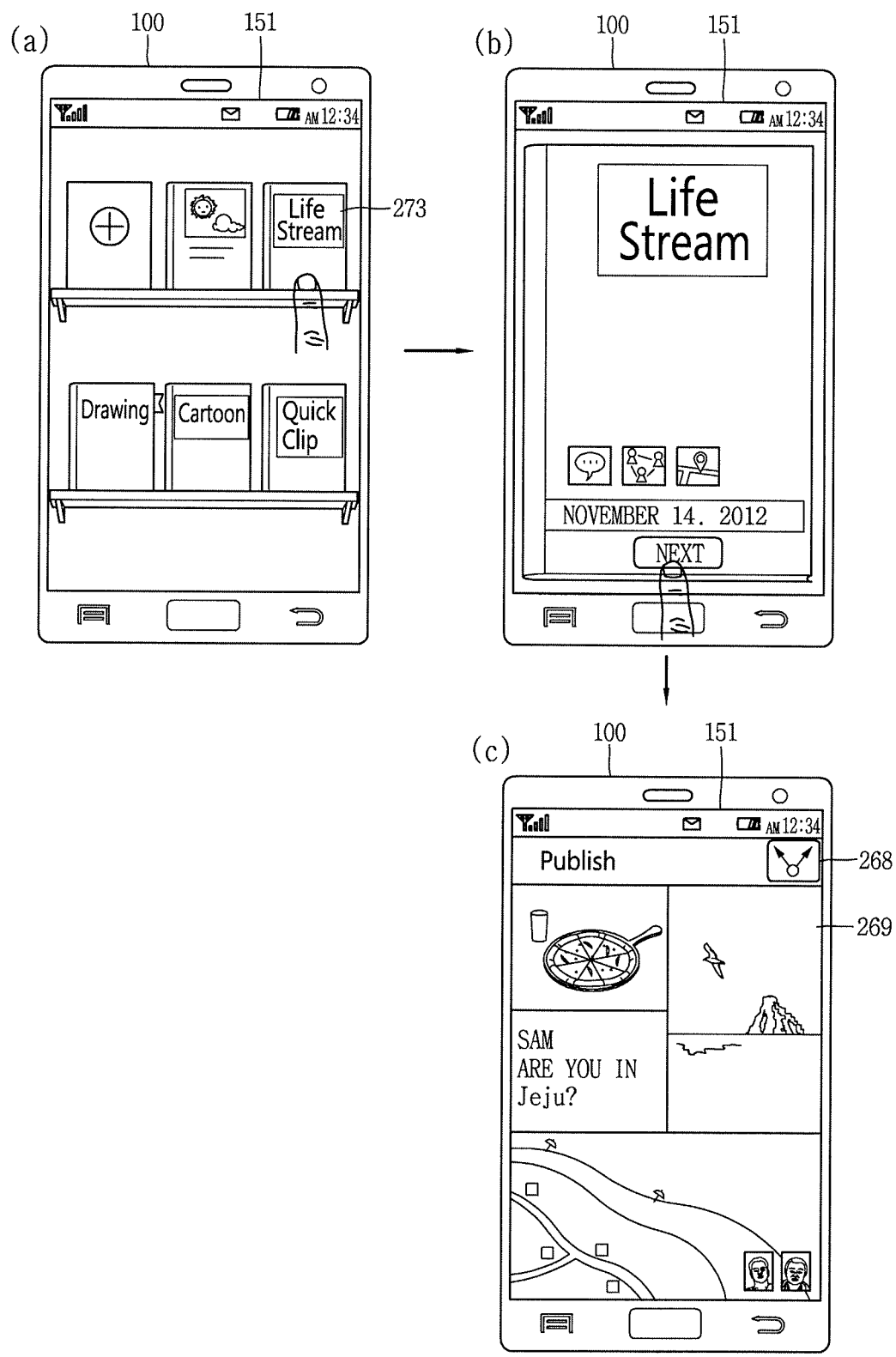
Figure 15:
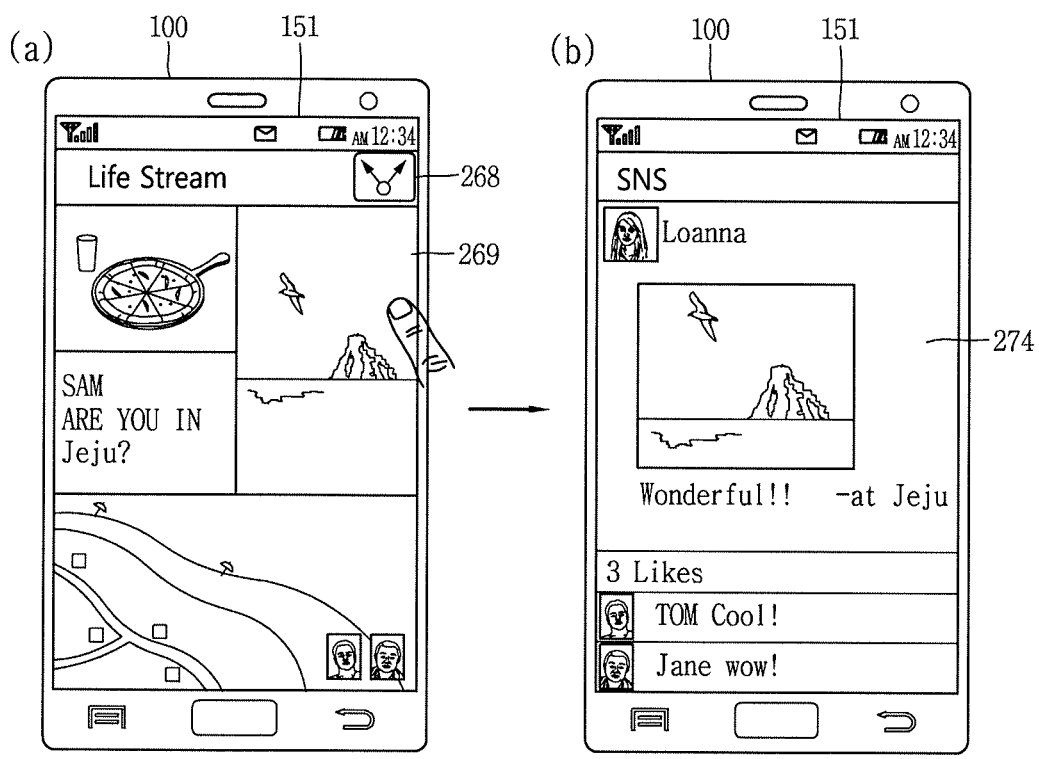

FIGS. 13 to 15 are conceptual views showing user interfaces for generating an electronic note including grouped contents. A mobile terminal 100 may include a memory 160 (see FIG. 1), a user input unit 130 (see FIG. 1) and a controller 180 (see FIG. 1).

As shown in FIG. 13A, the controller 180 may arrange the grouped contents 257 to 260 according to the preset template information and display them in the form 269 of electronic publication. Here, when the electronic note generate icon 267 is selected, an electronic note including the contents 257 to 260 arranged according to the preset template information may be generated.

Although not shown, the controller 180 may allow the user to select whether or not to include detailed contents of the contents 257 to 260 in the electronic note.

For example, the controller 180 may allow the user to select whether or not to include comment contents of SNS contents in the electronic note. Also, the controller 180 may allow the user to select whether or not to immediately play music contents when a page of the electronic note including the music contents is displayed on the display unit 151.

As the electronic note is generated, as shown in FIG. 13B, a popup window 272 indicating that the electronic note has been generated may be displayed on the display unit 151.

Here, the user may execute various control operations associated with the electronic note using menu items and the like. For example, the user may convert the electronic note into a form of a PDF file or an image file. Also, the user may share the electronic note with another party.

Afterwards, referring to FIG. 13C, the display unit 151 may display an electronic bookshelf including the electronic note. As shown, the generated electronic note 273 may be displayed on the electronic bookshelf together with other electronic notes.

As described, according to the present disclosure, the controller 180 may realize an electronic note by including contents generated in various applications for a preset period of time. The user may have fun as viewing the electronic note. Consequently, user convenience may be improved.

Hereinafter, a configuration of executing the electronic note will be described with reference to FIG. 14.

As shown in FIG. 14A, when the generated electronic note 273 is selected, the controller 180 may execute the selected electronic note 273. Also, as shown in FIG. 14B, the display unit 151 may display a cover of the electronic note 273. Although not shown, the display unit 151 may also display a page of the electronic note 273 while executing the electronic note 273.

The cover of the electronic note 273 may include information related to the contents 257 to 260 included in the electronic note 273. In detail, the cover of the electronic note 273 may display at least part of condition information which was previously executed for extracting the contents 257 to 260 of the electronic note 273.

Accordingly, date information and application information related to the contents 257 to 260 constructing the electronic note 273 may be displayed on the cover of the electronic note 273. Although not shown, the other party's information or location information related to the contents 257 to 260 may also be displayed on the cover of the electronic note 273.

As one example, an icon for the other party, corresponding to the other party's information related to the contents 257 to 260, may be displayed on the cover of the electronic note 273. Here, when the icon for the other party is selected, contents which have log information relating to the other party selected may all be displayed on the display unit 151.

The user may share at least part of all the contents, having the log information relating to the other party, with the other party.

Afterwards, when a control command for displaying the next page of the electronic note 273 is sensed, as shown in FIG. 14C, the controller 180 may display the contents 257 to 260 constructing the electronic note 273 on the display unit 151 in the form 269 of the electronic publication. Here, the user may share at least part of pages of the electronic note 273 using the share icon 268 output on the display unit 151.

Hereinafter, a configuration of displaying a page linked to a content will be described with reference to FIG. 15.

As shown in FIG. 15A, the controller 180 may arrange grouped contents 257 to 260 according to preset template information and display them on the display unit 151 in the form 269 of the electronic publication.

Here, when one (for example, SNS content) of the contents 257 to 260 is selected, as shown in FIG. 15B, the controller 180 may display a page linked to the selected content on the display unit 151. Accordingly, the display unit 151 may display an SNS webpage 274 linked to the selected SNS content.

Although not shown, the user may edit the SNS webpage 274 displayed on the display unit 151. The controller 180 may reflect the edited result to the electronic note 273.

Figure 16:
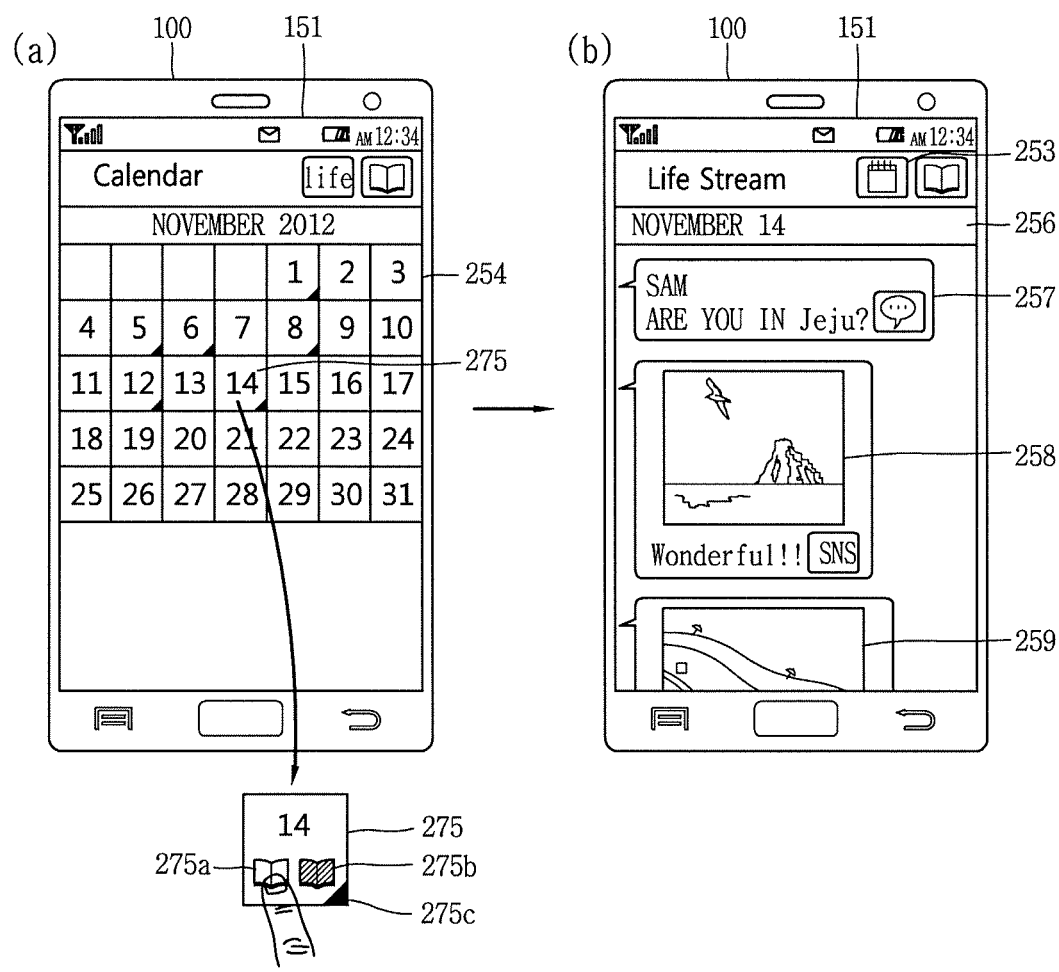
FIGS. 16 and 17 are conceptual views showing user interfaces for displaying contents in response to touch inputs applied onto an electronic calendar.
Figure 17:
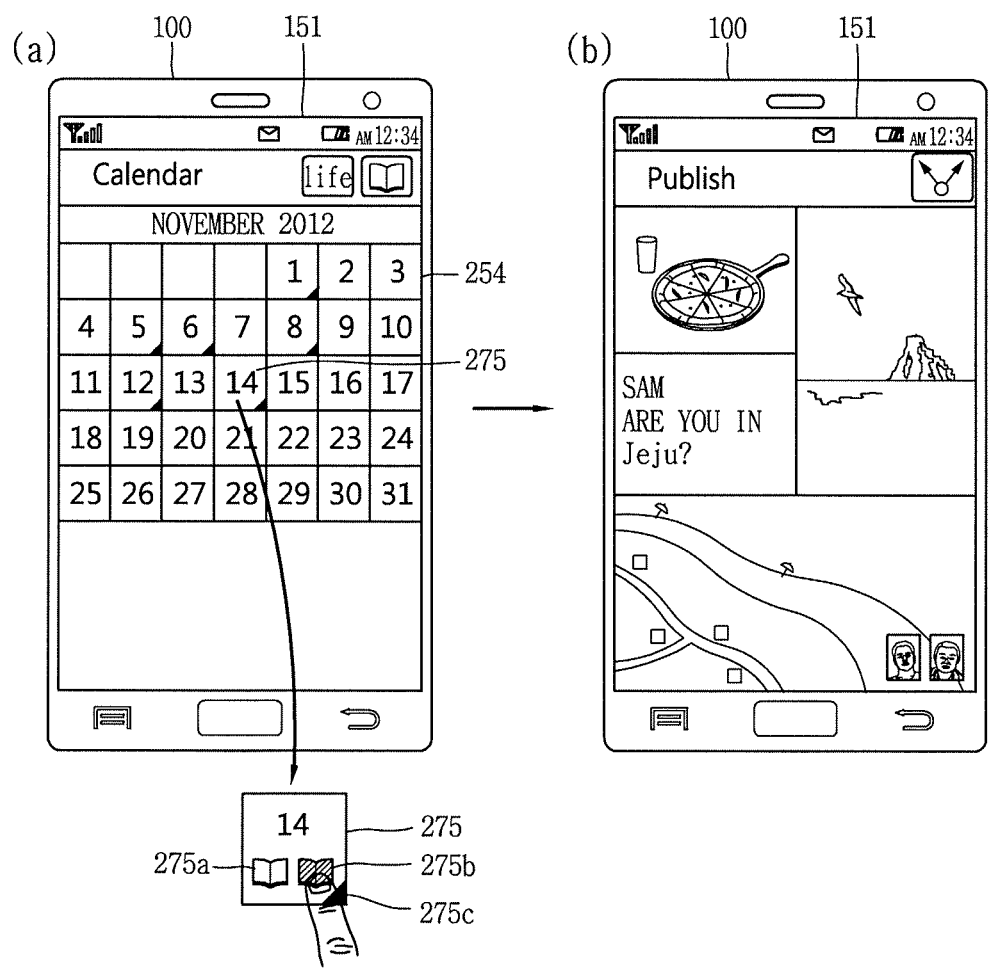

FIGS. 16 and 17 are conceptual views showing user interfaces for displaying contents in response to touch inputs applied onto an electronic calendar. A mobile terminal 100 may include a memory 160 (see FIG. 1), a user input unit 130 (see FIG. 1) and a controller 180 (see FIG. 1).

As shown in FIGS. 16A and 17A, the display unit 151 may display an electronic calendar 254. The electronic calendar 254 may include a plurality of dates. As shown, at least one icon may be displayed on some of the plurality of dates included in the electronic calendar 254.

For example, when contents are extracted based on condition information, a first icon 275a may be displayed on a date that the extracted contents have been generated. Also, a second icon 275b may be displayed on a date on which contents constructing an electronic note have been generated. A third icon 275c may also be displayed on a date that contents have been registered.

The user may select at least one of the first to third icons 275a to 275c while the electronic calendar 254 is displayed. Or, the user may enlarge a size of the electronic calendar 254 through a pinch-in touch input or the like and then select at least one of the first to third icons 275a to 275c on the enlarged screen.

For example, as shown in FIG. 16A, when the first icon 275a displayed on one date 275 of the plurality of dates is selected, the controller 180, as shown in FIG. 16B, may extract contents which have date information corresponding to the first icon 275a as log information and output the extracted contents 257 to 259 on the display unit 151.

As shown in FIG. 17A, when the second icon 275b displayed on one date 275 of the plurality of dates is selected, the controller 180, as shown in FIG. 17B, may display a page of the electronic note 273 including contents which have date information corresponding to the second icon 275b as log information on the display unit 151.

FIG. 18 is a conceptual view showing a user interface for allowing a user to select whether or not to set contents as a target to be extracted when the contents are generated. A mobile terminal 100 may include a memory 160 (see FIG. 1), a user input unit 130 (see FIG. 1) and a controller 180 (see FIG. 1).

As shown in FIG. 18A, the controller 180 may generate contents. For example, the controller 180 may generate an SNS content 276 on an SNS execution screen.

Here, the controller 180 may allow the user to select whether or not to set the generated SNS content 276 as a target to be extracted later according to condition information. To this end, the display unit 151 may display a check box 277 which allows the user to select whether or not to set the generated SNS content 276 as the target to be extracted later according to the condition information.

Although not shown, the controller 180 may allow the user to select whether or not to set each of detailed contents included in the generated SNS content as a target to be extracted later according to condition information. For example, the controller 180 may allow the user to select whether or not to set comment contents of the SNS content 276 as a target to be extracted later according to condition information.

In the meantime, the controller 180 may allow the user to select whether or not to extract music contents of the SNS content 276 or only link information related to the music contents, even though the music contents are set as the target to be extracted later according to the condition information. Also, the controller 180 may allow the user to select whether or not to immediately play the music contents after extraction.

As shown in FIG. 18B, the user may upload the generated SNS content 276 after selecting a check box 277. In this case, referring to FIG. 18C, the controller 180 may display an icon 278 on a date (for example, 24th of November) on which the SNS content 276 was generated on the electronic calendar 254.

Although not shown in FIGS. 1 to 18, the controller 180 may execute the following operations using user's location information.

For example, the controller 180 may predict a user's expected moving path based on user's moving path information up to now or user's current location information, and display information (for example, coupon information, map information, etc.) according to the expected moving path on the display unit 151.

The controller 180 may also display user's moving path information on a map screen based on the user's moving path information up to now. Here, the controller 180 may tag counterparty information who moved with the user on the map screen.

When new location information relating to the user is sensed based on user's location information for a preset period of time, the controller 180 may generate an electronic note including contents, which are generated in relation to the later sensed location information.

The controller 180 may execute the following operations using user-interested information.

For example, the controller 180 may receive user-interested information (for example, stock information), and collect information related to the received user-interested information by a preset period for a preset time duration. Afterwards, the controller 180 may generate an electronic note including the collected information.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a memory configured to store a plurality of contents associated with a plurality of applications and tag information relating to each of the plurality of contents;
    a touch screen; and
    a controller configured to:
    display an electronic calendar;
    extract contents from among the plurality of contents in response to a touch input on a first icon for extracting the contents, the contents satisfying condition information, based on the tag information related to each of the plurality of contents;
    display at least one of the extracted contents in response to a selection of the at least one of the extracted contents and a touch input on a second icon for grouping the at least one of the extracted contents, wherein the second icon is displayed on or near the extracted contents;
    generate an electronic note comprising at least one of the extracted contents in response to a touch input on a third icon for generating the at least one of the extracted contents as the electronic note, the electronic note including a cover page and at least one page; and
    control the touch screen to display the electronic note comprising the at least one of the extracted contents.

2. The mobile terminal of claim 1, wherein the plurality of contents are stored together with tag information relating to each of the plurality of contents, and the extracted contents are extracted related to a date from the plurality of contents based on the tag information, and
    wherein the condition information further comprises at least one of application type information related to the extracted contents, format information related to the extracted contents, date information related to the contents, location information related to the extracted contents and counterparty information tagged to the extracted contents.

3. The mobile terminal of claim 2, further comprising a display unit,
wherein the controller sequentially displays a plurality of condition information input screens on the touch screen, the plurality of condition information input screens allowing for an input of different condition information, respectively.

4. The mobile terminal of claim 1, wherein the touch screen displays the extracted contents on a first area of a plurality of areas, and displays icons corresponding to the plurality of applications, respectively, on a second area of the plurality of areas, and
wherein the controller displays contents for only an application corresponding to at least one of the plurality of icons displayed on the second area, of the extracted contents, when the at least one icon is selected.

5. The mobile terminal of claim 4, wherein the controller determines an arrangement order of the extracted contents displayed on the first area based on an arrangement order of the icons displayed on the second area.

6. The mobile terminal of claim 1, wherein the controller groups the extracted contents into one group when a grouping icon is selected while the extracted contents are displayed.

7. The mobile terminal of claim 6, wherein the touch screen displays template information candidates for arranging each of the grouped contents, and
wherein the controller arranges the grouped contents based on one template information when the one template information is selected from the template information candidates, and generates the electronic note including the grouped contents arranged based on the template information.

8. The mobile terminal of claim 7, wherein the controller recommends template information for arranging each of the grouped contents, among the template information candidates, based on attribute information relating to each of the grouped contents.

9. The mobile terminal of claim 7, wherein the touch screen displays an electronic bookshelf including the electronic note, and
wherein the controller arranges contents constructing the electronic note according to preset template information to display on the touch screen when the electronic note is selected.

10. The mobile terminal of claim 9, wherein the controller displays a page linked to one content of the arranged contents on the touch screen when the one content is selected from the arranged contents.

11. The mobile terminal of claim 9, wherein the controller displays the cover page of the electronic note on the electronic bookshelf, and
wherein the cover page of the electronic note displays at least part of condition information previously executed for extracting the contents constructing the electronic note.

12. The mobile terminal of claim 7, wherein the controller extracts date information related to each of the extracted contents and displays first icons on dates corresponding to the extracted date information on the electronic calendar, and
wherein the controller extracts additional contents having date information corresponding to at least one of the first icons as log information and displays the additional contents when the at least one first icon is selected.

13. The mobile terminal of claim 12, wherein the controller extracts date information related to each of the contents constructing the electronic note and displays second icons, different from the first icons, on dates corresponding to the extracted date information on the electronic calendar, and
wherein the controller displays a page including contents which have date information corresponding to at least one of the second icons as log information when the at least one second icon is selected from the electronic note.

14. A control method for a mobile terminal, the method comprising:
storing a plurality of contents associated with a plurality of applications and tag information relating to each of the plurality of contents;
displaying, on a touch screen, an electronic calendar;
extracting contents in response to a touch input on a first icon for extracting the contents, the contents satisfying condition information, based on the tag information related to each of the plurality of contents;
display at least one of the extracted contents in response to a selection of the at least one of the extracted contents and a touch input on a second icon for grouping the at least one of the extracted contents, wherein the second icon is displayed on or near the extracted contents;
generating an electronic note comprising at least one of the extracted contents in response to a touch input on a third icon for generating the at least one of the extracted contents as the electronic note, the electronic note including a cover page and at least one page; and
controlling the touch screen to display the electronic note comprising the at least one of the extracted contents.

15. The method of claim 14, wherein the plurality of contents are stored together with tag information relating to each of the plurality of contents, and the extracted contents are extracted related to a date from the plurality of contents based on the tag information, and
wherein the condition information further comprises at least one of application type information related to the extracted contents, format information related to the extracted contents, date information related to the contents, location information related to the contents and counterparty information tagged to the extracted contents.

* * * * *